(12) United States Patent
Zang et al.

(10) Patent No.: US 7,833,499 B2
(45) Date of Patent: Nov. 16, 2010

(54) SEPARATION PROCESS

(75) Inventors: Tiejun Zang, Bellaire, TX (US); V. Kenneth Turner, La Porte, TX (US)

(73) Assignee: Merichem Company, Houston, TX (US)

(*) Notice: Subject to any disclaimer, the term of this patent is extended or adjusted under 35 U.S.C. 154(b) by 803 days.

(21) Appl. No.: 11/818,300

(22) Filed: Jun. 14, 2007

(65) Prior Publication Data

US 2008/0308503 A1   Dec. 18, 2008

(51) Int. Cl.
*C01D 1/36* (2006.01)
(52) U.S. Cl. .................. 423/183; 210/708; 210/718; 210/721; 210/750; 210/763; 210/799; 210/804
(58) Field of Classification Search ......... 210/691–694, 210/708, 721, 763, 804, DIG. 5, 718, 750, 210/799; 208/203; 423/183
See application file for complete search history.

(56) References Cited

U.S. PATENT DOCUMENTS 3,574,093 A * 4/1971 Strong .................. 208/206
3,758,404 A    9/1973 Clonts
3,977,829 A    8/1976 Clonts
3,992,156 A   11/1976 Clonts
4,626,341 A   12/1986 Verachtert
4,666,689 A *  5/1987 Maple et al. ................ 423/183
4,875,997 A   10/1989 Langford
5,017,294 A *  5/1991 Durrieu .................... 210/708
5,480,547 A    1/1996 Williamson et al.

FOREIGN PATENT DOCUMENTS

CA      507179      9/1954
EP     0207797      7/1987

OTHER PUBLICATIONS

International Search Report and Written Opinion for PCT/US2008/006403 mailed on Nov. 20, 2008, completed on Sep. 29, 2008.

* cited by examiner

*Primary Examiner*—Matthew O Savage
(74) *Attorney, Agent, or Firm*—McDonnell Boehnen Hulbert & Berghoff LLP

(57) ABSTRACT

A separation process for separating two or more immiscible liquids using fiber-film technology is disclosed. This separation process is especially useful in the separation of disulfide oil formed during the oxidation of spent caustic solution that was used to remove sulfur contaminates from light hydrocarbons.

16 Claims, 2 Drawing Sheets

SEPARATION PROCESS

FIELD OF INVENTION

Our invention relates generally to a novel separation technology that uses the high surface area and coalescing properties of fiber film technology to achieve rapid separation of two immiscible liquids. A specific application of our invention relates to an improved separation process where an admixture of disulfides and caustic solution created during a process for the removal of sulfur and other contaminants from hydrocarbons, including liquid petroleum gas ("LPG"), is separated into a aqueous caustic stream for recycle and an organic stream containing the disulfides. Our invention significantly reduces separation residence times, thus reducing equipment costs and improving the overall efficiency of the process.

BACKGROUND OF THE INVENTION

Separation of two immiscible liquids into two distinct liquid layers for recovery of each is well known to the art. However, most separation devices rely primarily on large vessels that use gravity and long residence times to achieve the phase separation or formation of distinct layers. Alternatively, forced physical separation of the two liquids is accomplished using complex mechanical devices, such as centrifuges, which also require a large energy input, or using membranes with selective permeability characteristics. With pressing needs for more economical processes that also are more compact to conserve space, a smaller more efficient separation is needed.

The enactment of the US Clean Air Act of 1990 has reached its zenith in North America with the gasoline pool being required to contain less than 10-wppm of sulfur. This means from a practical standpoint that the refinery normally makes a gasoline pool containing less than 5-wppm to allow for pipeline contamination of residue wall "clingage" sulfur from previous shipments and the accuracy of the testing method dictated by the Clean Air Act.

Another consequence of the Clean Air Act of 1990 has been the shutting down of the small inefficient refiners in America going from 330 plus refiners in 1980 to less than 175 refiners in 2007. No new refiners have been built in the past 25 years, but refiner expansions and imports have satisfied the gasoline demand in America.

The existing refiners have also gone to higher severity Fluid Catalytic Cracking Unit operations to reduce the amount of burner fuel while producing additional higher octane gasoline and increased olefin production. These olefins are propane/propylene and butane/isobutane/isobutylene. These are the feedstocks for the next processing step which is an alkylation unit. Some refiners alkylate amylenes (pentene) depending on their economic models.

Most refineries use either an HF (hydrofluoric acid) or a sulfuric acid alkylation unit to alkylate mixed butylenes or mixed propylene's and butylenes. Alkylation is a process where isobutane reacts with the olefin to make a branched chain paraffin. Since sulfur is detrimental to the alkylation process, a caustic treating system is in place at most refineries to extract the easily extracted methyl and ethyl mercaptans and the more difficult propyl mercaptans present in the mixed olefinic liquid petroleum gas ("LPG") stream.

Typically, liquid-liquid contactors are employed for the caustic treatment and in some cases fiber-film contactors as described in U.S. Pat. Nos. 3,758,404; 3,977,829 and 3,992,156, all of which are incorporated herein by reference. To conserve caustic, a caustic regenerator is almost always employed. A typical process flow scheme for treating LPG involves a first caustic treatment using at least one liquid-liquid contactor to extract the sulfur contaminants, typically mercaptans, from the LPG feed, which generates a "spent" caustic solution that is rich in mercaptan or so called rich caustic, separating the LPG in the contactor, oxidizing the rich caustic to convert mercaptans to disulfides (typically referred to as disulfide oil ("DSO")) which generates an "oxidized" caustic solution, and then using a gravity separator to separate the DSO from the oxidized caustic solution. In some instances a granular coal bed is used in conjunction with the gravity settling device as a coalescer to further assist in the separation of the DSO from the oxidized caustic. Once the DSO is removed, the regenerated caustic can then be recycled and mixed with fresh make-up caustic and used in the liquid-liquid contactors to treat the LPG feed.

As mentioned, the use of gravity settling devices in prior art processes are plagued by the requirement of long residence times, especially when applied to separating DSO from an oxidized caustic solution. These long residence times negatively impact the economics of the caustic treating process. In addition, the prior art gravity settlers are relatively large pieces of equipment. Likewise, the forced separation devices, such as centrifuges, are complex mechanical devices that require large energy input to operate. Our invention now solves the problems found in prior art separation equipment when two immiscible liquids need separation and particularly when applied to separating DSO from caustic solutions. Our invention utilizes two novel improvements that can be employed separately or in combination. The first involves the use of fiber-film technology, which is typically only found in liquid-liquid contacting applications, and the second involves the use of solvent injection before oxidation of the spent caustic solution. Our process can also use a polishing step after DSO separation to further remove residual DSO from the oxidized caustic solution. Greatly reduced residence times and the reduction in equipment size translate into an extremely economical method of removing sulfur compounds from LPG, and consequently, minimize capital and operating costs. These and other advantages will become evident from the following more detailed description of the invention.

SUMMARY OF THE INVENTION

As mentioned, our invention relates to an improved separation process for separating an admixture of at least two immiscible liquids using fiber-film technology and finds specific application in the separation of DSO and other hydrocarbons from a caustic solution. Our invention achieves separation residence times many times faster than conventional gravity settlers whether or not such conventional settlers use a coal bed coalescer. Moreover, we have found that using a small amount of solvent added prior to the oxidation step further improves the separation performance over conventional gravity settler technology.

Although it is well known to use fiber-film technology in liquid-liquid contactor applications in which two immiscible liquids contact each other for enhanced mass transfer of certain compounds, the art has not recognized that fiber-film technology is capable of performing an actual separation of two immiscible liquids fed as an admixture in a single stream. This is despite the fact that the fiber film technology has been commercialized for 35 plus years while the need for an efficient and improved separation process has long existed. Likewise, we are unaware of the use of fiber-film technology for separation because the fibers do not provide the selectivity resulted from physical size restriction as in the membrane technology, nor does it force physical separation by large energy input such as in the centrifuge technology. Instead, our invention utilizes large surface area fibers to form thin liquid films within which a coalescing effect is achieved due to a drastically restricted path length.

As used herein, disulfide oil or DSO is meant to include a mixture of possible disulfides, including dimethyl disulfide, diethyl disulfide, methyl ethyl disulfide and higher disulfides. Likewise, the term mercaptan is meant to include any of a class of organosulfur compounds that are similar to the alcohol and phenol, but containing a sulfur atom in place of the oxygen atom. Compounds containing —SH as the principal group directly attached to carbon are named 'thiols'.

One aspect of our invention involves the separation of at least two immiscible liquids, such as, but not limited to, an admixture of water, or an aqueous solution, and hydrocarbons. This admixture is fed as a single stream to a separation device where the single stream contacts a bundle of high surface area fibers. As the admixture contacts and runs down the numerous individual fibers, a thin film of liquid is formed around each fiber and a coalescing effect is achieved due to the drastically restricted path length within the liquid film. In conjunction with the exceptionally high surface area of the fiber films, the two liquids quickly separate from each other and form two distinct layers in a collection zone at the bottom of separation device. The two distinct liquid layers, a lower layer comprising the higher density liquid and an upper layer comprising the lower density liquid allow for each to be withdrawn separately from the separation device. Examples of admixtures that benefit from the novel separation process of our invention include, but are not limited to, admixtures of hydrocarbons, such as propane, butanes, pentanes, condensate, natural gas, molecular sieve regeneration gas, diesel, kerosene, gasoline, lube oils, light crude, edible oil, biofuel, biodiesel, biodiesel reaction products, and any reaction products from a petrochemical plant such as polyols, POSM, and vinyl chloride and water, with water or an aqueous solution, including acidic, neutral or basic solutions that may contain dissolved salts and other organic or inorganic constituents. As a result of using fiber-film technology we have surprisingly found that residence times are greatly reduced by an order of magnitude compared to the conventional gravity settling equipment. We believe this is caused by the increased interfacial surface area as compared to a conventional gravity separator (CGS), even in circumstances where the CGS uses a coal bed as a coalescer.

Our invention also finds a specific application in processes for removing sulfur contaminants from LPG and other hydrocarbon streams where a stream of rich caustic containing mercaptan compounds is fed to an oxidizer. Oxidizing the mercaptan compounds to form DSO at a conversion level of 90% or greater in the presence of an oxygen containing gas, which results in the formation of an admixture of DSO, caustic and gas; feeding this admixture as a single stream to a separation device where the admixture contacts a bundle of fiber film; separating the DSO from the caustic within the separation device by forming two distinct liquid layers in a collection zone at the bottom of the separation device, where the lower layer comprises a caustic phase and the upper layer comprises DSO; and removing the DSO from the separation device by withdrawing a portion of the upper layer and removing the caustic from the separation device by withdrawing a portion of the lower layer.

Although the art has recognized that gravity settling can be used to separate water (or an aqueous solution) from hydrocarbons, those prior art separation techniques typically require the use of one or more a liquid-liquid contactors downstream of the CGS where a flow of solvent is used to wash the separated oxidized caustic solution to extract residual DSO down to acceptable levels so the caustic is suitable for recycling back to the primary liquid-liquid contactor section where the contaminated hydrocarbons, such as LPG, are fed. Our invention replaces both the CGS and the downstream liquid-liquid contactors with a single fiber-film separation device. This clearly saves on capital and operating costs, but also saves valuable real estate because its foot print is much smaller than the combination of the CGS and liquid-liquid contactors. As mentioned, it is well known to use fiber-film technology in liquid-liquid contactor applications; however, we are unaware of any fiber-film technology to perform separation of two immiscible liquids. Our invention also does not require any solvent addition to effect separation of the DSO from the oxidized caustic solution. Unique to our invention is the requirement of only a single stream containing an admixture of the immiscible liquids being fed to the separator device containing the bundle of fibers. No additional process streams are needed to effect the separation. In a specific application of our process we were able to separate DSO from oxidized caustic solution down to below 5 ppm in the caustic. Our invention will also find utility in reverse process applications where an acidic aqueous solution is used to extract basic compounds from a liquid, such as a hydrocarbon based liquid. The only important factor is that at least two immiscible liquids are in admixture that is fed as a single stream to the fiber film separator.

These and other objects will become more apparent from the detail description of the preferred embodiment contained below.

DETAILED DESCRIPTION OF PREFERRED EMBODIMENTS

As stated, our invention concerns a novel process for the separation of at least two immiscible liquids in an admixture using fiber-film technology. One specific application of our invention relates to caustic treatment of hydrocarbons, such as LPG to remove contaminants, such as sulfur compounds, that are deleterious to downstream processes. In particular, our invention replaces conventional gravity settlers or forced separation technology, such as centrifuges, with a separation vessel employing high surface area fiber film technology to separate oxidized sulfur contaminants from the caustic solution. This novel use of fiber film technology drastically reduces the residence time typically needed for separation by an order of magnitude. In addition, we have found that the addition of a small stream of solvent into, or upstream of, the oxidizer further improves the downstream separation performance when using fiber film technology.

Figure 1:
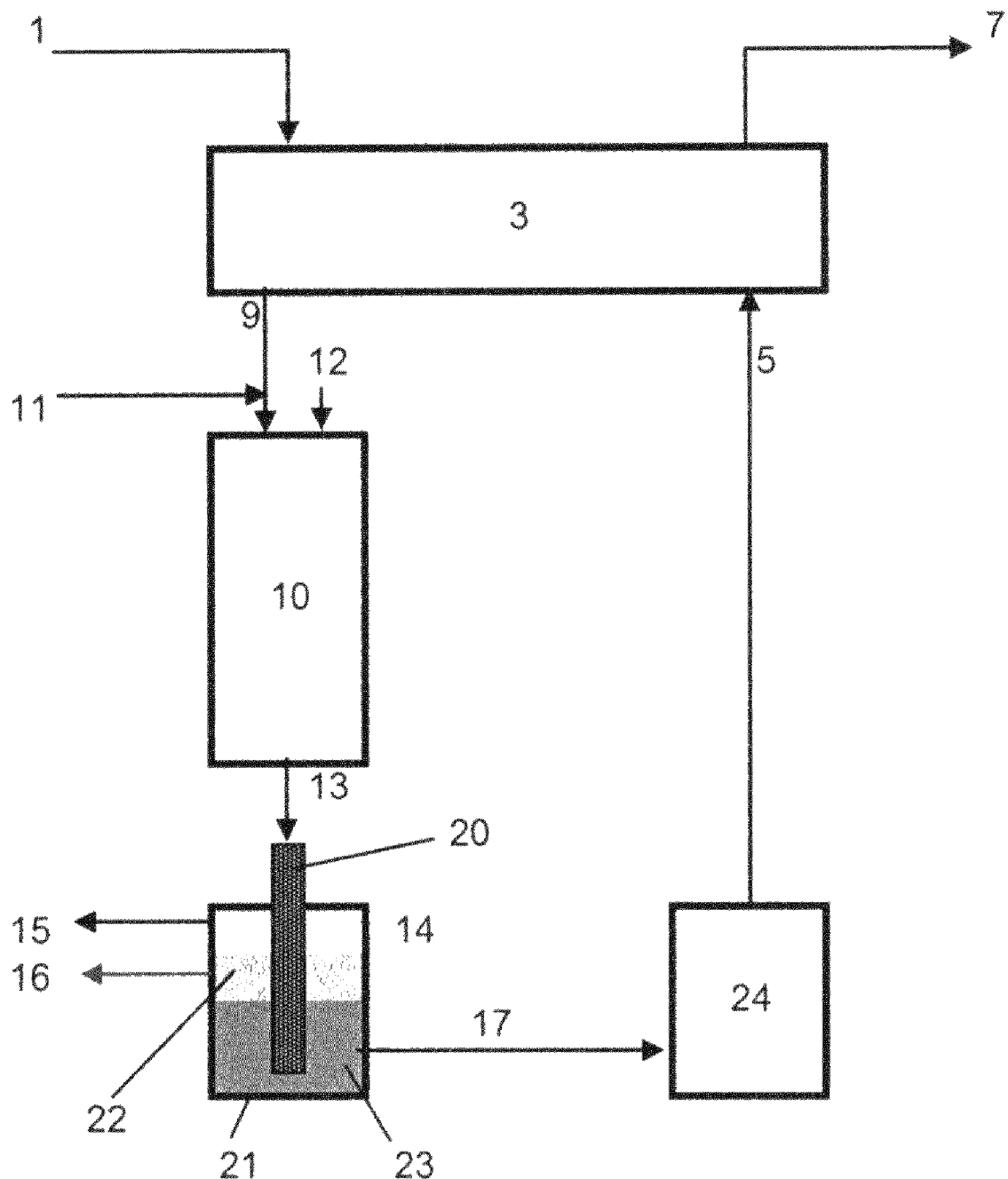
FIG. 1 schematically illustrates one possible embodiment of the process of our invention using fiber-film technology to separate DSO from caustic, where a small stream of solvent is added prior to the oxidation step.

FIG. 1 illustrates one embodiment of our invention where LPG feed, contaminated with mercaptan compounds, for example ethyl mercaptide, is fed via line 1 to a caustic treatment section 3. The specific design of the caustic treatment section is not critical to our invention; however, a preferred design includes staged contactors operating in a counter-current configuration, with a most preferred contactor configuration using fiber film liquid-liquid contactors. These as well as other contactor configurations are well known to those skilled in the art. Lean caustic is fed via line 5 into contactor treatment section 3 where it mixes with LPG introduced via line 1. The caustic used in our invention can be any type known to the art of sweetening hydrocarbons, including solutions comprising NaOH, KOH, Ca(OH)2, Na2CO3, ammonia, extraction of organic acids, or mixtures thereof. Preferably, the caustic comprises aqueous potassium hydroxide solutions and aqueous sodium hydroxide solutions having concentration of from about 1% to about 50%, more preferably from about 3% to about 25%, still more preferably from about 5% to about 20%, by weight alkali hydroxide.

Substantially sulfur free LPG is removed from contactor section 3 via line 7 and is used in subsequent processes, for example, in an alkylation unit. By substantially sulfur free we mean the LPG has a sulfur level of <150 ppm total sulfur, preferably <20 ppm total sulfur and more preferably <10 ppm total sulfur. The caustic solution from contactor section 3 is a rich caustic solution that is removed via line 9. Rich caustic contains the mercaptans and other sulfur contaminants extracted from the LPG feed.

The rich caustic from the caustic treatment section is then fed to oxidizer 10. As with the liquid-liquid contactors, the exact design of the oxidizer is not critical to our invention and any number of oxidizer designs may be used, such as air bubble oxidizers, non-catalytic solid packing and solid catalyst technology. A preferred oxidizer is one that contains a solid bed of catalyst, preferably a catalyst containing an active metal, such as cobalt, impregnated on a solid support, for example, activated carbon. A most preferred catalyst is one sold commercially by Merichem Company under the brand name ARI™-120L. In one alternative embodiment of our invention a small volume solvent stream 11 is introduced to oxidizer 10 along with the rich caustic stream. This solvent stream can be mixed with the rich caustic prior to entering the oxidizer or injected as a separate stream into the oxidizer. The solvent can be any light hydrocarbon that will assist in the downstream separation of the DSO from the caustic solution after oxidation. Any relatively light hydrocarbon or mixture of such hydrocarbons can be used as a solvent in our invention, however, preferred solvents included naphtha and kerosene. Although the exact mechanism of how the solvent improves the separation of DSO from the oxidized caustic is not specifically known, one theory is that the solvent has a much higher solubility of DSO than caustic, with their differential of solubility providing an extractive driving force. This effect is further magnified by carrying out the process in a fiber film device that provides higher interfacial surface area. The amount of solvent, based on the volume percent of the rich caustic feed, injected into the oxidizer, either with the rich caustic or separately, is not especially critical to our invention as long as a minimum amount is used so as to improve the down-stream separation performance. As mentioned only a small volume of solvent is needed, with a preferred range of minimum solvent injection from about 0.1 vol % to about 10.0 vol %, preferably from about 0.5 vol. % to about 5.0 vol. %, of the rich caustic feed via line 9.

In addition to the rich caustic and solvent feeds to the oxidizer, air or other oxygen containing gas(es) is introduced to the oxidizer through line 12. The amount of oxygen containing gas added to the oxidizer is sufficient to achieve 95+% oxidation of the mercaptan compounds originally present in the LPG to disulfide compounds, most preferably 99+% oxidation. A preferred range of operating conditions for the oxidizer includes a temperature of from about 75° F. to about 200° F. and a caustic flow rate of as high as 10 LHSV, but preferably from about 100° F. to about 150° F. and less than 5 LHSV. The operating pressure of our process is not critical so long as it keeps the process streams in a liquid state.

The effluent from oxidizer 10, or the oxidized caustic, which is an admixture of caustic and DSO, is removed via line 13 from oxidizer 10 and passed to separator 14 where the DSO is separated from the caustic using fiber film technology. Separator 14 can be any device that uses a column of tightly packed fibers and that provides large surface area. As mentioned, such fiber film technology has been used in the past in liquid-liquid contactors to facilitate mass transfer of chemical compounds from one liquid to another liquid, but to our knowledge have never been employed solely for the purpose of separating an admixture of two or more immiscible liquids. The design of these fiber film liquid-liquid contactors has been described in various references, for example, in U.S. Pat. Nos. 3,758,404, 3,992,156, 4,666,689, 4,675,100 and 4,753,722, all of which are incorporated herein by reference for all purposes. Our invention is the first to utilize fiber film technology in a separation application. We are not using it as a mass transfer liquid-liquid contactor. Accordingly, only a single feed stream needs to be fed to the bundles of high surface area fibers. In the specific application illustrated in FIG. 1, the admixture comprises oxidized caustic containing DSO and residual gases. This admixture is fed via single line 13 to separator 14. The oxidized caustic with DSO and gases enters the top of the fiber bundle 20 that comprises substantially elongated fibers mounted in a shroud and contained within a conduit. This conduit is provided with an inlet flange and a fluid distribution means for distributing the oxidized caustic with DSO from line 13 onto the fibers. The fibers in separator 14 are selected from a group consisting of, but not limited to, metal fibers, glass fibers, polymer fibers, graphite fibers and carbon fibers to meet two criteria: (1) the fiber material must be preferentially wetted by the admixture of at least two immiscible liquids; and (2) the fibers must be of a material that will not contaminate the process or be destroyed by it, such as by corrosion.

During the operation of separator 14 two layers form in the bottom of collection vessel 21; a lower layer 23 comprising regenerated caustic solution and an upper layer 22 comprising separated DSO. FIG. 1 also illustrates an alternative embodiment where a small stream of solvent added upstream of oxidizer 10. When this alternative is used, the added solvent is removed along with the DSO in upper layer 22. Off gases are removed from the top of collection vessel 21 through line 15. The shroud and fibers of the fiber bundle extend partly within the confines of separator 14, with the positioning of the downstream end of the fiber bundle within collection vessel 21 being such that the downstream end within lower layer 23. The DSO plus solvent in upper layer 22 is removed from separator vessel 14 via line 16 and sent to storage or for further processing.

The residence time within separator 14 is selected to achieve maximum removal of the DSO from the caustic phase, with the target concentration being 5 ppm or less. Surprisingly, we have found that the use of fiber film technology, with and without the added solvent, greatly decreases the required residence time by an order of magnitude compared to a conventional gravity settling device. As explained more fully in the examples below, the use of fiber film technology reduces residence time from approximately 90 minutes for a gravity settler to less than 5 minutes for a fiber film separator of our invention. Adding solvent as explained above further improves separation performance as shown by the graph described in the following examples.

The rate of removal of the caustic solution in lower layer 23 via line 17 is adjusted to maintain the correct residence time necessary to achieve DSO levels in this layer to 5 ppm or less measured as sulfur. The separated caustic solution in stream 17 may be further purified in a polishing unit 24, to ensure that its DSO content is less than 5 ppm. Various polishing procedures are well known to the art, most of which involve liquid/liquid contacting technology. The final purified caustic is then removed from vessel 24 as lean caustic and recycled via line 5 to the caustic treatment section 3.

EXAMPLE

To demonstrate the surprising and unexpected performance of our invention, laboratory testing was performed to compare a conventional gravity settler (CGS) to the fiber film separator of our invention. A 1-inch diameter oxidizer loaded with ARI-120L solid catalyst was used to oxidize a rich caustic solution containing about 7000 ppm sulfur of ethyl mercaptide to a conversion level of 99+% at a temperature of about 125° F., 4.0 LHSV and 25 psig back pressure. Air was injected at about 300 ml/min. In separate tests kerosene was injected into the oxidizer at a rate of about 1.5 ml/min.

The effluent from the oxidizer containing about 7000 ppm DSO sulfur as diethyl disulfide was first fed into a 3-inch diameter CGS and allowed to settle via gravity. After 5 and 90 minutes of residence time, the DSO level in the caustic dropped to about 76 and 6 ppm, respectively (FIG. 2).

The CGS was then replaced with a fiber film separator, with the fibers providing an extremely large surface area. The fiber film separator contained 150 metal fibers in a shroud placed within a ⅜ inch diameter conduit. This same set-up was used when solvent injection into the oxidizer was performed.

Figure 2:
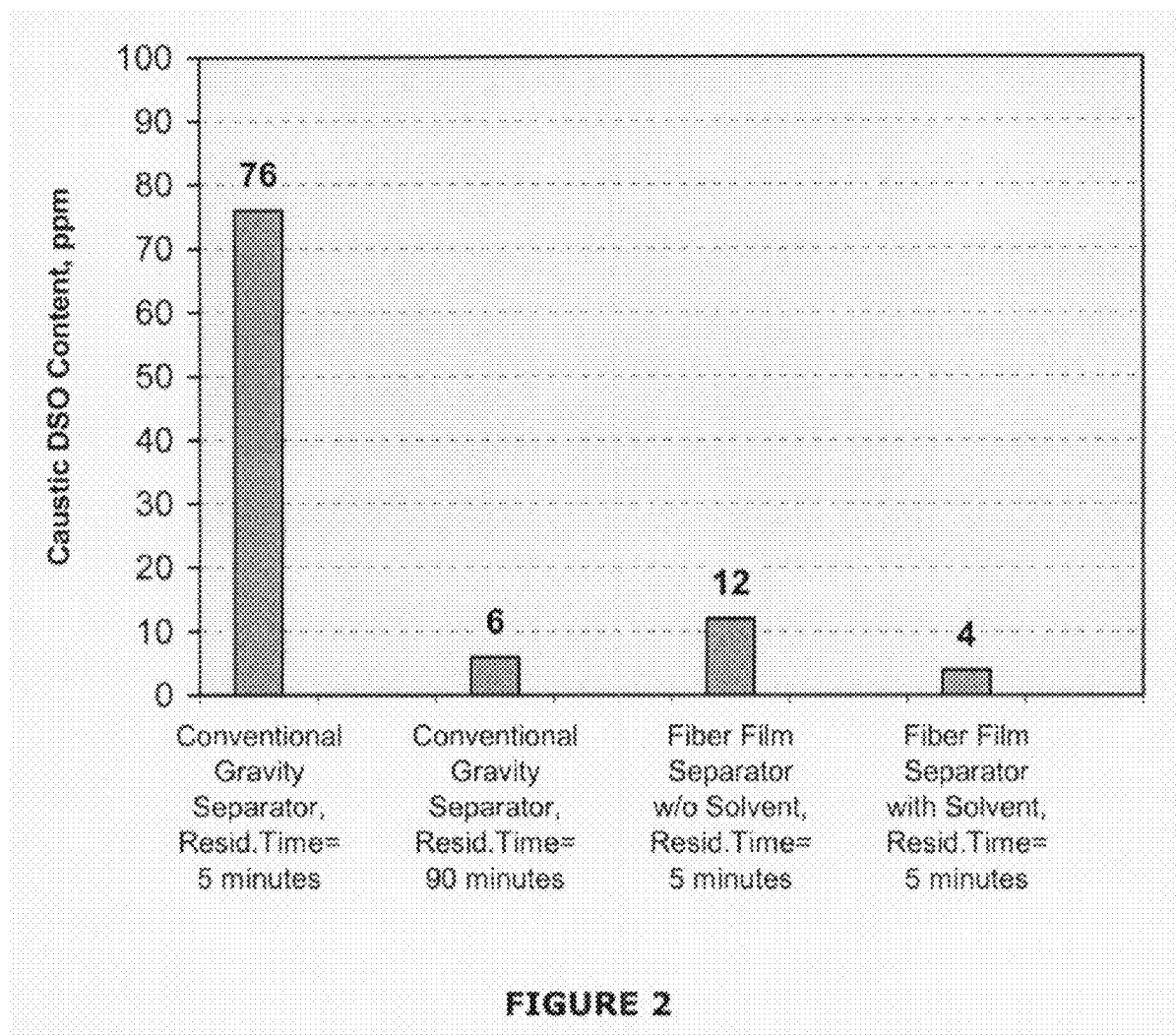
FIG. 2 is a graphical representation showing the effectiveness of our invention compared to a conventional gravity separator.

The graph shown in FIG. 2 shows the comparison of the fiber film separator to the CGS. With the CGS, the caustic contained 76 ppm DSO at a residence time of 5 minutes. Surprisingly the fiber film separator of our invention yielded a caustic DSO content of only 12 ppm at the same residence time of 5 minutes.

The effect of adding 5 vol. % of solvent (as kerosene) to the oxidizer is also shown in FIG. 2. The injection of solvent combined with fiber film separation reduced the DSO content to 4 ppm at a residence time of 5 minutes.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation within the terms of the following claims.

We claim:

1. A process for separating mercaptan compounds from a rich caustic stream, comprising, in combination:
    a) feeding a stream of rich caustic containing mercaptan compounds to an oxidizer;
    b) oxidizing the mercaptan compounds to disulfide oil (DSO) at a conversion level of 90% or greater in the presence of oxygen and forming an admixture of two immiscible liquids comprising DSO and caustic;
    c) removing the admixture formed in step b) from the oxidizer and introducing the admixture as a single stream to a separation device where the admixture contacts a vertical hanging bundle of fibers contained in an elongated shroud, wherein only said single stream is introduced at a top of said vertical hanging bundle of fibers; and
    d) separating the DSO from the caustic within the separation device by allowing the admixture to flow vertically down through the bundle of fibers where coalescing occurs to form two distinct liquid layers, a lower layer comprising a caustic phase and an upper layer comprising a DSO phase, in a collection zone, 2. The process of claim 1 where the stream of rich caustic containing mercaptan compounds is oxidized by contacting the stream with a solid bed containing a metal supported catalyst.

3. The process of claim 1 where the caustic from the separation device is fed to a polishing process to remove any trace quantities of DSO not separated in the separation device and other residual sulfur compounds.

4. The process of claim 1 where an oxygen containing gas is supplied to the oxidizer and any residual gas is removed as off gas in the separation device.

5. The process of claim 1 further comprising removing the DSO phase from the separation device by withdrawing the upper layer.

6. The process of claim 1 further comprising removing the caustic phase from the separation device by withdrawing the lower layer.

7. The process of claim 1 further comprising removing the DSO phase from the separation device by withdrawing the upper layer and removing the caustic phase from the separation device by withdrawing the lower layer.

8. A process for separating mercaptan compounds from a rich caustic stream, comprising, in combination:
    a) feeding two separate streams to an oxidizer, both a rich caustic stream, containing mercaptan compounds, and a solvent stream to an oxidizer;
    b) oxidizing the mercaptan compounds to disulfide oil (DSO) at a conversion level of 90% or greater in the presence of oxygen forming an admixture comprising DSO, caustic, and solvent;
    c) removing the admixture formed in step b) from the oxidizer and introducing the admixture as a single stream to a separation device where the admixture contacts a vertical hanging bundle of fibers contained in an elongated shroud, wherein only said single stream is introduced at a top of said vertical hanging bundle of fibers; and
    d) separating the DSO from the caustic within the separation device by allowing the admixture to flow vertically down through the bundle of fibers where coalescing occurs to form two distinct liquid layers, a lower layer comprising a caustic phase and an upper layer comprising a DSO phase, in a collection zone.

9. The process of claim 8 where the stream of rich caustic containing mercaptan compounds is oxidized by contacting the stream with a solid bed containing a metal supported catalyst.

10. The process of claim 8 where the caustic from the separation device is fed to a polishing process to remove any trace quantities of DSO not separated in the separation device and other residual sulfur compounds.

11. The process of claim 8 where the solvent fed to the oxidizer is less than 10 vol. % of the rich caustic being fed to the oxidizer.

12. The process of claim 8 where the solvent fed to the oxidizer is removed with the DSO in the upper layer.

13. The process of claim 8 where an oxygen containing gas is supplied to the oxidizer and any residual gas is removed as off gas in the separation device.

14. The process of claim 8 further comprising removing the DSO phase from the separation device by withdrawing the upper layer.

15. The process of claim 8 further comprising removing the caustic phase from the separation device by withdrawing the lower layer.

16. The process of claim 8 further comprising removing the DSO phase from the separation device by withdrawing the upper layer and removing the caustic phase from the separation device by withdrawing the lower layer.

* * * * *

UNITED STATES PATENT AND TRADEMARK OFFICE
CERTIFICATE OF CORRECTION

PATENT NO.         : 7,833,499 B2  
APPLICATION NO.    : 11/818300  
DATED              : November 16, 2010  
INVENTOR(S)        : Tiejun Zhang et al.

Page 1 of 1

It is certified that error appears in the above-identified patent and that said Letters Patent is hereby corrected as shown below:

Title Page, Item (12), please delete "Zang" and replace with the phrase --Zhang--.

Title Page, Item (75) Inventors, please delete "Zang" and replace with the phrase --Zhang--.

Signed and Sealed this  
Fourth Day of January, 2011

David J. Kappos  
*Director of the United States Patent and Trademark Office*

UNITED STATES PATENT AND TRADEMARK OFFICE
CERTIFICATE OF CORRECTION

| | |
|---|---|
| PATENT NO. | : 7,833,499 B2 |
| APPLICATION NO. | : 11/818300 |
| DATED | : November 16, 2010 |
| INVENTOR(S) | : Tiejun Zhang et al. |

It is certified that error appears in the above-identified patent and that said Letters Patent is hereby corrected as shown below:

Title Page, Item (75) Inventors, please delete "Kenneth" and replace with the phrase -- Keith V. --

Signed and Sealed this
Twenty-fifth Day of January, 2011

David J. Kappos
*Director of the United States Patent and Trademark Office*